US010981594B2

(12) United States Patent
Abuaita et al.

(10) Patent No.: US 10,981,594 B2
(45) Date of Patent: Apr. 20, 2021

(54) METHODS FOR STEERING SYSTEM OVERLOAD DETECTION

(71) Applicant: GM GLOBAL TECHNOLOGY OPERATIONS LLC, Detroit, MI (US)

(72) Inventors: Raed N. Abuaita, Fenton, MI (US); John T Zuzelski, Clarkston, MI (US); Bo Yu, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 357 days.

(21) Appl. No.: 16/022,824

(22) Filed: Jun. 29, 2018

(65) Prior Publication Data

US 2020/0001912 A1 Jan. 2, 2020

(51) Int. Cl.
*B62D 5/04* (2006.01)
*B62D 15/02* (2006.01)
*B62D 1/181* (2006.01)
*B62D 1/183* (2006.01)

(52) U.S. Cl.
CPC ........... *B62D 5/0481* (2013.01); *B62D 1/181* (2013.01); *B62D 1/183* (2013.01); *B62D 15/021* (2013.01)

(58) Field of Classification Search
CPC ...... B62D 5/0481; B62D 1/181; B62D 1/183; B62D 15/021
See application file for complete search history.

(56) References Cited

U.S. PATENT DOCUMENTS

| 4,661,752 A * | 4/1987 | Nishikawa | B62D 1/181 307/10.1 |
| 10,654,511 B1 * | 5/2020 | Cao | B62D 1/181 |
| 2013/0099524 A1 * | 4/2013 | Brown | E05F 15/605 296/146.9 |
| 2016/0121918 A1 * | 5/2016 | Soderlind | B62D 1/197 74/493 |
| 2016/0347347 A1 * | 12/2016 | Lubischer | B62D 1/181 |
| 2017/0253268 A1 * | 9/2017 | Lin | B62D 5/0481 |
| 2017/0297606 A1 * | 10/2017 | Kim | B62D 1/181 |
| 2018/0273081 A1 * | 9/2018 | Lubischer | B62D 1/19 |
| 2019/0031224 A1 * | 1/2019 | Huber | B62D 1/181 |
| 2019/0185044 A1 * | 6/2019 | Pichonnat | B62D 1/197 |

* cited by examiner

*Primary Examiner* — Donald J Wallace
(74) *Attorney, Agent, or Firm* — Quinn IP Law

(57) ABSTRACT

An exemplary method for controlling a vehicle includes providing a vehicle steering system, the vehicle steering system including a moveable steering column assembly and a motor coupled to the steering column assembly, providing a sensor connected to the motor and configured to measure a motor characteristic, providing a controller electronically connected to the sensor and the vehicle steering system, monitoring, by the controller, sensor data received from the sensor if a trigger condition is satisfied, analyzing, by the controller, the sensor data related to the motor characteristic to determine if an overload condition is satisfied, and if the overload condition is satisfied, automatically generating, by the controller, a control signal to control the motor.

12 Claims, 3 Drawing Sheets

METHODS FOR STEERING SYSTEM OVERLOAD DETECTION

INTRODUCTION

The present invention relates generally to the field of vehicles and, more specifically, to steering wheels and steering columns for motor vehicles.

Autonomous and semi-autonomous vehicles may include a telescoping steering column to allow the steering wheel to retract away from the occupant to provide more space in the vehicle cabin. During a stowing operation in which the steering wheel column is moving in the axial direction, interference can occur. Methods to detect steering system overload and prevent pinching events could prevent bodily harm to the occupant and interrupted functionality to the stowable steering column.

SUMMARY

Embodiments according to the present disclosure provide a number of advantages. For example, embodiments according to the present disclosure enable detection of steering wheel column overload and protection of the occupant from pinch events caused by movement of the steering wheel and/or steering wheel column during a stowing event.

In one aspect, a method for controlling a vehicle is disclosed. The method includes the steps of providing a vehicle steering system, the vehicle steering system including a moveable steering column assembly and a motor coupled to the steering column assembly, providing a sensor connected to the motor and configured to measure a motor characteristic, providing a controller electronically connected to the sensor and the vehicle steering system, monitoring, by the controller, sensor data received from the sensor if a trigger condition is satisfied, analyzing, by the controller, the sensor data related to the motor characteristic to determine if an overload condition is satisfied, and if the overload condition is satisfied, automatically generating, by the controller, a control signal to control the motor.

In some aspects, the motor is configured to translate the steering column assembly from a first position to a second position.

In some aspects, the trigger condition includes one or more of an initiation of a stowing operation of the steering column assembly, detection of a hands-off or hands-free steering condition of the vehicle, and receipt of sensor data indicating that the steering column assembly has stopped moving.

In some aspects, the motor characteristic is a motor velocity.

In some aspects, the method further includes starting a stowing process timer to measure a time period when the trigger condition is satisfied and analyzing the sensor data comprises measuring a change in length of the steering column assembly during the measured time period to determine a baseline motor velocity.

In some aspects, the method further includes determining a motor velocity delta from a current motor velocity and the baseline motor velocity and comparing the motor velocity delta to a maximum motor velocity delta to determine if the motor velocity delta is equal to or greater than the maximum motor velocity delta or if the motor velocity delta is less than the maximum motor velocity delta.

In some aspects, the overload condition is satisfied if the motor velocity delta is equal to or greater than the maximum motor velocity delta.

In some aspects, the method further includes calculating a detection confidence level from at least one lookup table stored in a memory of the controller.

In some aspects, the method further includes determining whether a termination condition is satisfied, wherein the termination condition includes one of receipt of sensor data indicating the steering column assembly is in a stowed position, the detection confidence level is high, and the stowing process timer has exceeded a maximum operation time.

In some aspects, the motor characteristic is a motor deceleration, and the method further comprises comparing a current motor deceleration to a motor deceleration threshold to determine if the current motor deceleration is equal to or greater than the motor deceleration threshold or if the current motor deceleration is less than the motor deceleration threshold, and the overload condition is satisfied if the current motor deceleration is equal to or greater than the motor deceleration threshold.

In some aspects, the motor characteristic is a motor current, and the method further comprises comparing a motor current to a motor current threshold to determine if the motor current is equal to or greater than the motor current threshold or if the motor current is less than the motor current threshold, and the overload condition is satisfied if the motor current is equal to or greater than the motor current threshold.

In another aspect, a method for detecting a pinch condition of a vehicle steering system is disclosed. The method includes the steps of providing the vehicle steering system, the vehicle steering system including a moveable steering column assembly, a steering wheel assembly including a steering wheel, and a motor coupled to the steering wheel assembly, providing a sensor connected to the steering wheel assembly and configured to measure a steering wheel angle, providing a controller electronically connected to the sensor and the vehicle steering system, applying, by the motor, a motor torque signal to the steering wheel assembly, monitoring, by the controller, steering wheel angle data received from the sensor if a trigger condition is satisfied, analyzing, by the controller, the steering wheel angle data to determine if a pinch condition is satisfied, and if the pinch condition is satisfied, automatically generating, by the controller, a control signal.

In some aspects, analyzing the steering wheel angle data further comprises comparing a measured steering wheel angle frequency response to a baseline steering wheel angle frequency response to determine if a steering wheel angle frequency response delta is equal to or greater than a maximum frequency response delta or if the steering wheel angle frequency response delta is less than the maximum frequency response delta.

In some aspects, the pinch condition is satisfied if the steering wheel angle frequency response delta is equal to or greater than the maximum frequency response delta.

In yet another aspect, a system for detecting a steering system condition is disclosed. The system includes a vehicle steering system including a steering column assembly, a steering wheel assembly, and a motor, a first sensor coupled to the motor, the first sensor configured to measure a motor characteristic, and a controller electronically connected to the first sensor and the vehicle steering system. The controller is configured to determine if a trigger condition is satisfied, monitor first sensor data received from the first sensor if the trigger condition is satisfied, analyze the first sensor data related to the motor characteristic to determine if an interference condition is satisfied, and if the interference condition is satisfied, automatically generate a control signal to control the motor.

In some aspects, the motor characteristic is a motor velocity, the controller is further configured to determine a motor velocity delta from a current motor velocity and a baseline motor velocity and compare the motor velocity delta to a maximum motor velocity delta to determine if the motor velocity delta is equal to or greater than the maximum motor velocity delta or if the motor velocity delta is less than the maximum motor velocity delta and the interference condition is satisfied if the motor velocity delta is equal to or greater than the maximum motor velocity delta.

In some aspects, the system further includes a second sensor coupled to the steering wheel assembly, the second sensor configured to measure a steering wheel angle, wherein the motor is configured to apply a motor torque signal to the steering wheel assembly and the controller is further configured to monitor steering wheel angle data received from the second sensor if the trigger condition is satisfied and analyze the steering wheel angle data to determine if a pinch condition is satisfied.

In some aspects, the controller is further configured to analyze the steering wheel angle data and compare a measured steering wheel angle frequency response to a baseline steering wheel angle frequency response to determine if an absolute value of the measured steering wheel angle frequency response minus the baseline steering wheel angle frequency response is equal to or greater than a maximum frequency response delta or if the absolute value of the measured steering wheel angle frequency response minus the baseline steering wheel angle frequency response is less than the maximum frequency response delta.

In some aspects, the pinch condition is satisfied if the absolute value of the measured steering wheel angle frequency response minus the baseline steering wheel angle frequency response is equal to or greater than the maximum frequency response delta.

In some aspects, the controller is further configured to mathematically estimate an interference torque from data obtained from the first sensor to determine if the interference condition is satisfied.

BRIEF DESCRIPTION OF THE DRAWINGS

The present disclosure will be described in conjunction with the following figures, wherein like numerals denote like elements.

Figure 1:
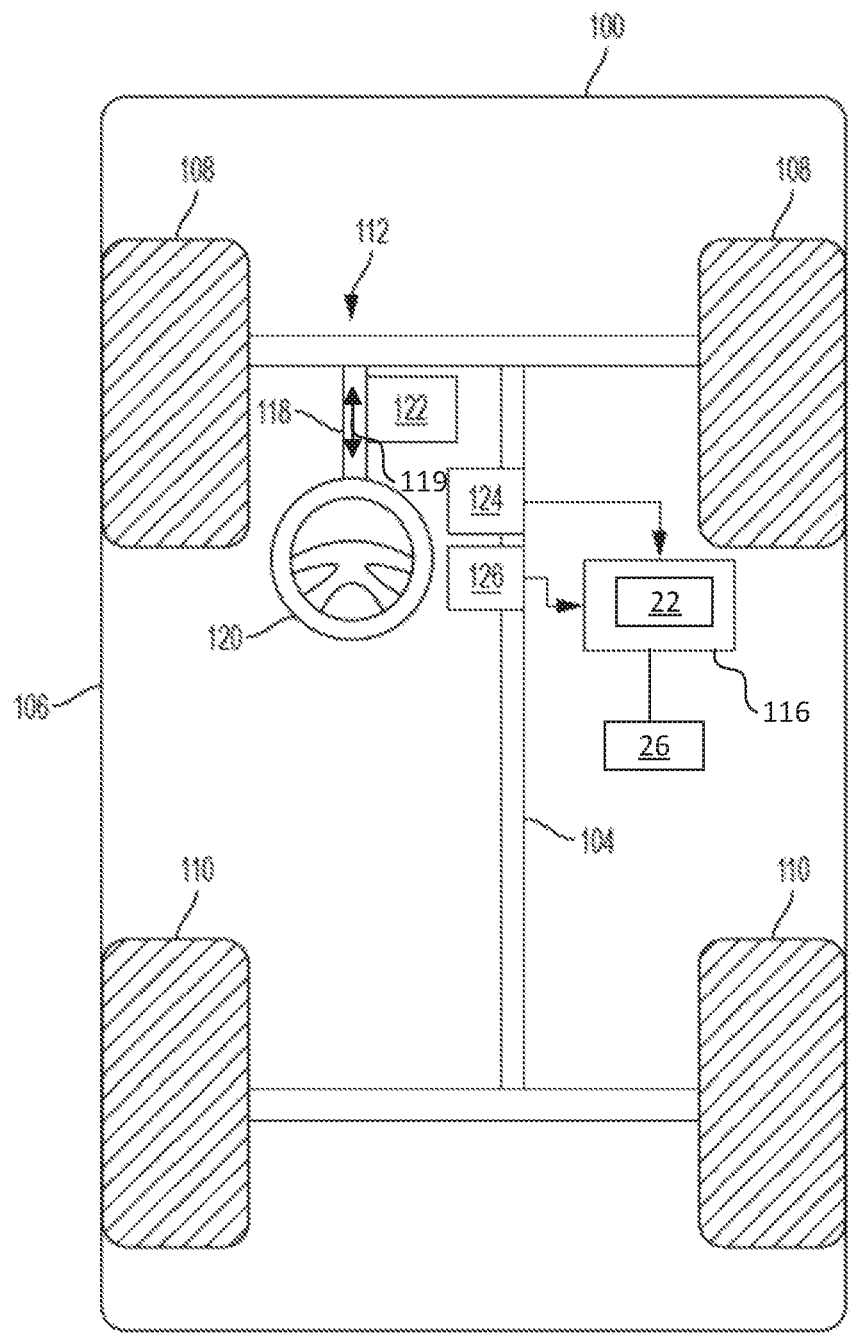
FIG. 1 is a schematic diagram of a vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Autonomous and semi-autonomous vehicles may include a telescoping steering column that allows the steering wheel to be stowed within the dashboard when not in use to increase the amount of usable space within the passenger compartment. However, during stowing or unstowing operations, contact with the telescoping column may result in an overload or underload condition that impairs steering column functionality. Additionally, the occupant's hand or finger may be pinched or caught by the moving components of the telescoping column assembly. The methods discussed herein detect overload, underload, and pinch events during the stowing and/or unstowing operation of the steering column and incorporate control system responses to stop/reverse/pause/etc. the translational motion of the steering column assembly.

With reference to FIG. 1, a vehicle 100 is shown that includes a steering system 112 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, and a control system 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In some embodiments, the steering system 112 includes a steering column assembly 118 and a steering wheel assembly 120. The steering column assembly 118 can be a collapsible assembly such that the steering column assembly 118 and the steering wheel assembly 120 can translate axially from a first, or unstowed, position to a second, or stowed, position, or any intermediate position between an unstowed or stowed position, as indicated by the arrow 119. In various embodiments, the steering system 112 is a steer-by-wire system that makes use of electric motors to provide steering assist, sensors to measure steering wheel angle and torque applied by the operator, and a steering wheel emulator to provide torque feedback to the driver.

In various embodiments, the steering system 112 includes at least one motor 122 that is coupled to the steering column assembly 118 (one motor 122 is shown in FIG. 1). In some embodiments, the motor 122 provides force to the road wheels 108, 110 or provides torque feedback to the vehicle operator for a steer-by-wire steering system 12. In some embodiments, the motor 122 can be coupled to the rotatable shaft of the steering column assembly 118 to enable telescoping functionality of the steering column assembly 118. In some embodiments, one or more motors 122 may be coupled to the steering column assembly 118, with a first motor 122 providing force to the road wheels 108, 110 and a second motor 122 enabling telescoping functionality of the steering column assembly 118. As discussed herein, operation of the one or more motors 122 can be monitored and controlled by the control system 116 to determine if an overload and/or pinch condition exists.

The steering system 112 further includes one or more sensors that sense observable conditions of the steering system 112. In various embodiments, the steering system 112 includes a torque sensor 124 and a steering angle sensor 126. The torque sensor 124 senses a rotational torque applied to the steering system by for example, a driver of the vehicle 100 via the steering wheel assembly 120 and generates torque signals based thereon. The steering angle sensor 126 senses a rotational position of the steering wheel 120 and generates position signals based thereon.

With further reference to FIG. 1, the vehicle 100 also includes a plurality of sensors 26 configured to measure and capture data on one or more vehicle characteristics, including but not limited to vehicle speed, vehicle heading, throttle position, ignition status, vehicle door open/close status, etc. The sensors 26 are electronically connected to the control system 116 and provide data on vehicle characteristics and operating conditions. In the illustrated embodiment, the sensors 26 include, but are not limited to, an accelerometer, a position sensor, a speed sensor, a heading sensor, gyroscope, steering angle sensor, or other sensors that sense observable conditions of the vehicle or the environment surrounding the vehicle and may include RADAR, LIDAR, optical cameras, thermal cameras, ultrasonic sensors, infrared sensors, pressures sensors, contact sensors, and/or additional sensors as appropriate.

The control system 116 includes a controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The control system 116 receives the sensor signals and monitors and/or controls operation of the steering system 112 based thereon. In general, the control system 116 receives the sensor signals, and processes the sensor signals over a certain time period to determine the motor 122 deceleration, velocity, and/or current and a steering wheel 120 vibration frequency response, to estimate an interference force, for example and without limitation. In some embodiments, the control system 116 is coupled to the steering column assembly 118.

Figure 2:
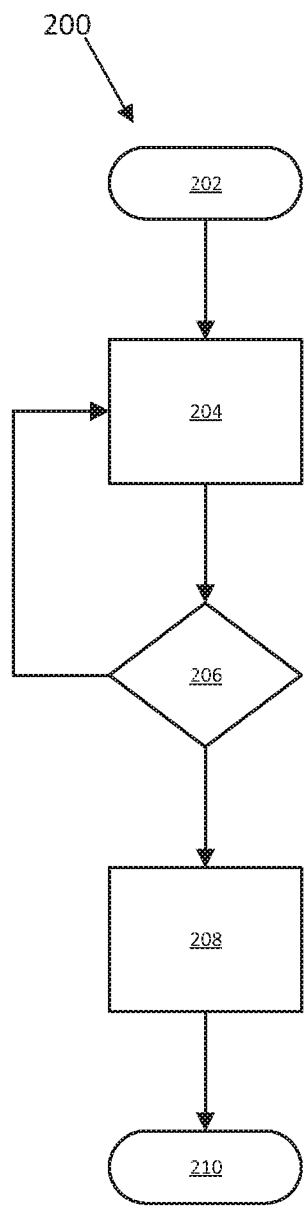
FIG. 2 is a flow diagram of a method to control a vehicle, specifically a steering column assembly of a vehicle, according to an embodiment.

FIG. 2 illustrates a method 200 to detect a steering system overload condition and/or pinch condition and generate a response. The method 200 can be utilized in connection with the steering system 112, the control system 116, and the various sensors 26, 124, 126. The method 200 can be utilized in connection with the controller 22 as discussed herein, or by other systems associated with or separate from the vehicle, in accordance with exemplary embodiments. The order of operation of the method 200 is not limited to the sequential execution as illustrated in FIG. 2, but may be performed in one or more varying orders, or steps may be performed simultaneously, as applicable in accordance with the present disclosure.

The method 200 begins at 202 and proceeds to 204. At 204, the controller 22 receives sensor data from one or more of the various sensors 26, 124, 126. The sensor data includes data on one or more vehicle characteristics, including, for example and without limitation, motor 122 deceleration, motor 122 velocity, motor 122 current, and a steering wheel 120 frequency response.

Next, at 206, the controller 22 determines whether one or more conditions are satisfied. In various embodiments, the controller 22 compares the sensor data to one or more thresholds. For example and without limitation, if sensor data related to the motor 122 deceleration is received, the motor deceleration data is analyzed to determine if the motor deceleration is above a first threshold. If sensor data related to the motor 122 velocity is received, the motor velocity data is analyzed to determine if the motor velocity is below a second threshold. If sensor data related to the motor 122 current is received, the motor current data is analyzed to determine if the motor current is above a third threshold. In various embodiments, the length of time a vehicle characteristic or condition (for example, motor velocity and/or motor current) is above or below the predefined threshold is also determined.

If one or more of the conditions are satisfied, that is, the motor deceleration is above a first threshold, the motor velocity is below a second threshold, and/or the motor current is above a third threshold, the method 200 proceeds to 208. At 208, the control system 116 generates one or more control signals to control various aspects of the steering system 112 including, for example and without limitation, stopping, slowing, or reversing translation of the steering column assembly 118 and stopping, slowing, or reversing rotation of the steering wheel assembly 120. The method 200 then proceeds to 210 and ends.

If, at 206, none of the conditions are satisfied, the method 200 returns to 204 and the controller 22 continues to monitor the sensor data as discussed herein.

Figure 3:
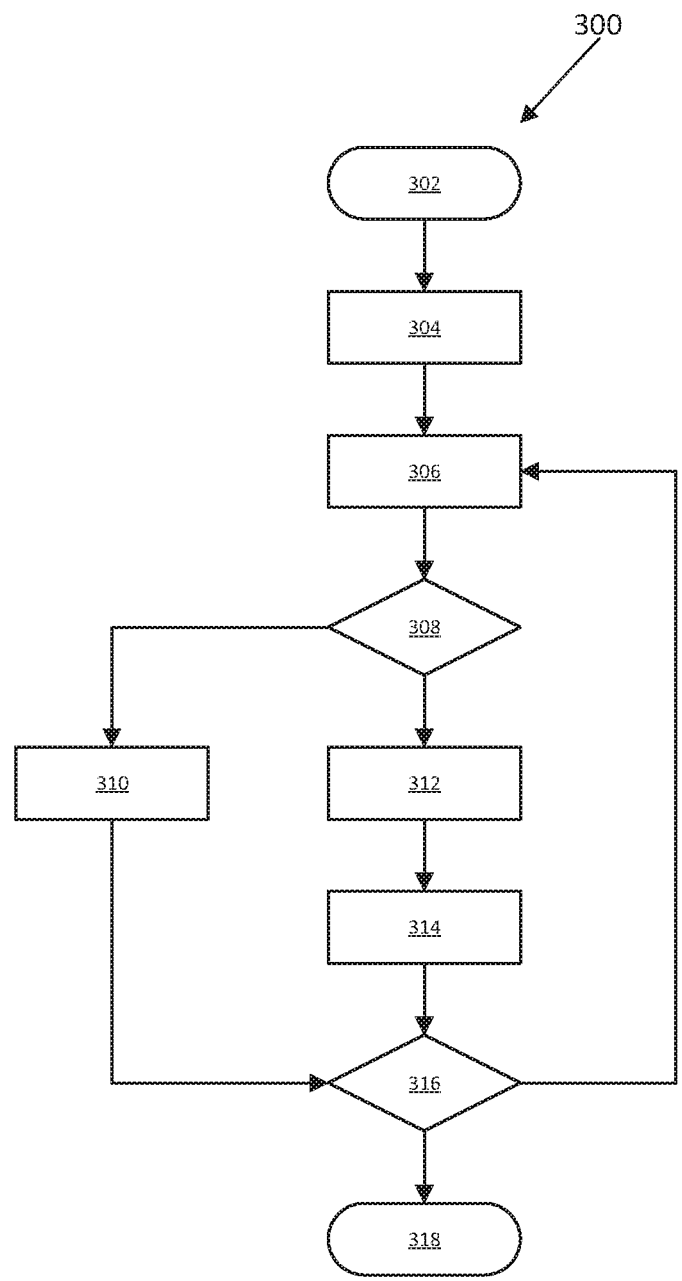
FIG. 3 is a flow diagram of a method to detect an overload condition of a vehicle steering system, according to an embodiment.

FIG. 3 illustrates a method 300 to detect a steering system overload condition using a motor data signal, according to an embodiment. The method 300 can be utilized in connection with the steering system 112, the control system 116, and the various sensors 26, 124, 126. The method 300 can be utilized in connection with the controller 22 as discussed herein, or by other systems associated with or separate from the vehicle, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure. The method 300 may be performed as part of the determination step, indicated at 206, of the method 200 discussed herein.

The method 300 begins at 302 in response to a trigger condition. The trigger condition includes one or more of initiation of a stowing and/or unstowing operation of the steering column assembly 118, detection of a hands-off or hands-free steering condition, sensor data indicating that the steering column assembly 118 has stopped moving, etc., for example and without limitation.

From 302, the method 300 proceeds to 304. At 304, the controller 22 resets a stowing process timer to a time of zero, and then starts the stowing process timer to measure an elapsed time period since the trigger condition. The stowing process timer is preferably integrated into the controller 22 of the control system 116 and is operable to measure time. The stowing process timer may include any device capable of measuring time, such as an electronic clock, and store in the memory of the controller 22 the elapsed period of time since the trigger condition was sensed. It should be appreciated that the stowing process timer measures the period of time continuously until stopped and reset to a value of zero. As discussed in greater detail herein, the time period measured by the stowing process timer is used to calculate the baseline motor 122 velocity and, in various embodiments, is used as an ending condition of the detection algorithm outlined in the method 300.

Next, at 306, the controller 22 measures the translational change in length of the telescoping steering column assembly 118 (that is, a steering column length delta). The controller 22 measures the translational change in length of the telescoping steering column assembly 118 during the time period measured by the stowing process timer. From the measured translational change in length and the measured stowing process time period, the controller 22 determines the corresponding baseline, or expected, motor 122 velocity. The baseline model is a physical, mathematical, or logical representation of the steering column assembly 18 stowing process driven by the motor 122 without any pinching or interference events. The baseline model receives one or more input signals and generates one or more output signals. The baseline model can be a look-up table, differential equations, neural network, or empirical models, for example and without limitation. In various embodiments, including the method 300, input signals to the baseline model include the measured distance and measured time period and the output is the baseline or expected motor velocity. The controller 22 measures the change in length in any suitable manner. For example, the controller 22 may sense and/or determine the position of the steering wheel 120 based on data received from a position sensor, one of the sensors 26. However, it should be appreciated that the controller 22 may use some other sensor capable of sensing the change in length or distance traveled by one or more components of the steering column assembly 118 and/or the steering wheel 120.

Next, at 308, the controller 22 compares the current measured motor velocity to the baseline motor velocity to determine if a measured motor velocity delta between the current measured motor velocity and the baseline motor velocity is equal to or greater than a predefined motor velocity delta, or if the delta between the current measure motor velocity and the baseline motor velocity is less than the predefined motor velocity delta. The predefined motor velocity delta is a threshold value indicating an acceptable amount of variation between the current motor velocity and the expected motor velocity. The predefined motor velocity delta is scalable based on the size and type of steering system 112, etc. Differences between the current motor velocity and the expected motor velocity in excess of the predefined motor velocity delta may indicate an overload condition. In various embodiments, the measured motor velocity delta also may indicate an underload condition. In an underload condition, the current motor velocity exceeds the expected motor velocity due to, for example and without limitation, the operator pushing the steering wheel in the translational direction of the stowable movement.

The controller 22 also resets an overload detection timer to a time of zero, and then starts the overload detection timer to measure an elapsed time period beginning when, for example, the absolute difference between the measured motor velocity and the baseline motor velocity is equal to or greater than a predefined threshold. The overload detection timer is preferably integrated into the controller 22 of the control system 116 and is operable to measure time. The overload detection timer may include any device capable of measuring time, such as an electronic clock, and store in the memory of the controller 22 the elapsed period of time since the absolute difference between the measured motor velocity and the baseline motor velocity was equal to or greater than the predefined threshold. It should be appreciated that the overload detection timer measures the period of time continuously until stopped and reset to a value of zero. In various embodiments, when the absolute difference between the measured motor velocity and the baseline motor velocity is lower than the predefined threshold, the overload detection timer is reset to zero.

If the controller 22 determines that the absolute value of the current measured motor velocity minus the baseline motor velocity is less than the predefined motor velocity delta, as indicated at 308, the method 300 proceeds to 310.

At 310, the controller 22 resets the overload detection timer to a time of zero. The sensor data related to the current measured motor velocity and the baseline motor velocity does not indicate that an overload condition exists.

However, if the controller 22 determines that the absolute value of the current measured motor velocity minus the baseline motor velocity is equal to or greater than the predefined motor velocity delta, an overload or underload condition is determined to exist and the method 300 proceeds to 312. At 312, the controller 22 updates the overload detection timer to indicate an increased period of time that the overload or underload condition exists and calculates an overload detection confidence level according to data accessed from one or more predefined lookup tables or from other sources such as mathematical equations. The lookup tables may be stored in the memory of the controller 22. The confidence level can be a value between 0% and 100%, with values close to 0% indicating low confidence that an overload or underload condition exists and values close to 100% indicating high confidence that an overload or underload condition exists. A predefined lookup table can be used to calculate the confidence level, for example and without limitation, a two-dimensional lookup table, where the two inputs are the time period measured by the overload detection timer and the absolute value of the current measured motor velocity minus the baseline motor velocity. Larger values of the absolute value of the current measured motor velocity minus the baseline motor velocity, as compared to predefined and calibratable values, indicate a higher confidence level. Similarly, a longer time period measured by the overload detection timer, and compared to predefined and calibratable values, indicates a higher confidence level.

From 312, the method 300 proceeds to 314. At 314, the controller 22 registers and stores the data indicating that an overload condition is detected and the associated confidence level.

From 314 and 310, the method 300 proceeds to 316. At 316, the controller 22 determines whether one or more conditions to terminate the detection method are satisfied and updates and enables the stowing process timer to continue to measure the elapsed time. In some embodiments, the termination conditions include, for example, sensor data indicating that the steering column assembly 118 has stopped translating, the steering wheel assembly 120 has stopped rotating, the steering wheel assembly 120 is in the stowed position, the confidence level is high, the stowing process timer and/or overload detection timer has exceeded a predefined maximum operation time, a target translational stowing distance is achieved, a signal to terminate the detection algorithm is received by the controller 22 from the vehicle operator either via a direct input or via a remote input, another steering system error is detected, etc. If one or more of the termination conditions are not satisfied, the method 300 returns to 306 and proceeds as discussed herein. If one or more of the termination conditions are satisfied, the method 300 proceeds to 318 and ends.

The method 300 is discussed with respect to measurement of a motor 122 velocity. However, it is understood that in various embodiments a motor deceleration is measured and compared to a deceleration threshold and, if the motor deceleration is above a predefined deceleration threshold, an overload condition exists. In various other embodiments, a motor current is measured and compared to a motor current threshold and, if the motor current is above the motor current threshold for a predefined time period, an overload condition exists. In various other embodiments, an estimated interference force can also be used to determine if an overload condition exists. An overload condition is also indicative of a condition in which some part of the occupant's hand or body may be pinched or caught between components of the steering column assembly 118 and/or the steering wheel assembly 120.

Figure 4:
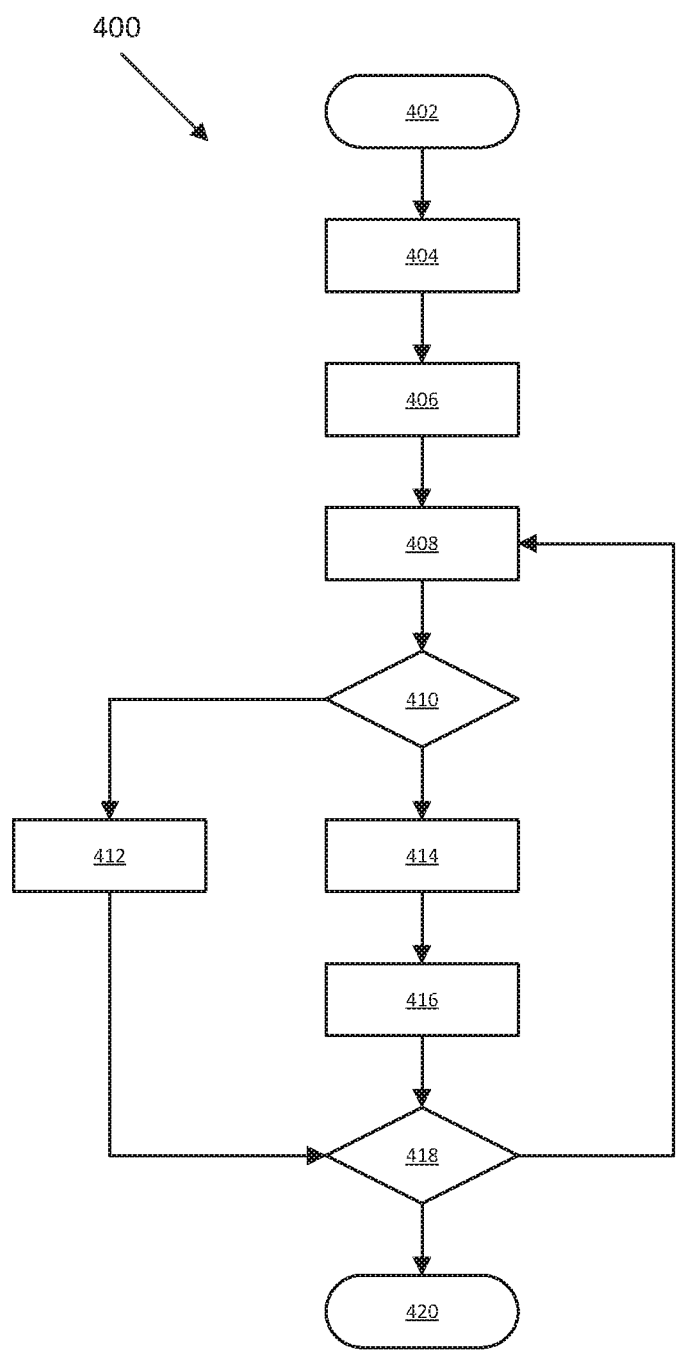
FIG. 4 is a flow diagram of a method to detect a pinch condition of a vehicle steering system, according to an embodiment.

FIG. 4 illustrates a method 400 to detect a pinch condition using steering wheel frequency vibration data, according to an embodiment. The method 400 can be utilized in connection with the steering system 112, the control system 116, and the various sensors 26, 124, 126. The method 400 can be utilized in connection with the controller 22 as discussed herein, or by other systems associated with or separate from the vehicle, in accordance with exemplary embodiments. The order of operation of the method 400 is not limited to the sequential execution as illustrated in FIG. 4, but may be performed in one or more varying orders, or steps may be performed simultaneously, as applicable in accordance with the present disclosure. The method 400 may be performed as part of the determination step, indicated at 206, of the method 200 discussed herein.

The method 400 begins at 402 in response to a trigger condition. The trigger condition includes one or more of initiation of a stowing and/or unstowing operation of the steering column assembly 118, detection of a hands-off or hands-free steering condition, sensor data indicating that the steering column assembly 118 has stopped moving, etc., for example and without limitation.

From 402, the method 400 proceeds to 404. At 404, the controller 22 generates a control signal to the motor 122 to apply a predefined steering wheel angle (SWA) vibration to the steering wheel assembly 120. Vibrations of SWA can be achieved by applying a sine wave or multisine motor 122 torque signal, or other vibrating motor torque signals. The predefined SWA vibration is preferably applied at a frequency that is not detectable to the occupant.

Next, at 406, the controller 22 measures and monitors the SWA signal. The controller 22 measures the SWA signal in any suitable manner. For example, the controller 22 may sense and/or determine the SWA frequency response of the steering wheel assembly 120 based on data received from a frequency sensor, one of the sensors 26, coupled to the steering wheel assembly 120. However, it should be appreciated that the controller 22 may use some other sensor capable of sensing the SWA frequency response of the steering wheel assembly 120. In various embodiments, the controller 22 applies one or more band-pass filters to the SWA sensor data to filter out measured frequencies falling outside of a predefined frequency band.

The method 400 then proceeds to 408. At 408, the controller 22 determines the absolute value of the measured SWA signal and applies one or more low-pass filters to the absolute value SWA data. The low-pass filter passes SWA signals with a frequency lower than a predefined cutoff frequency and attenuates signals with frequencies higher than the cutoff frequency such that the frequencies within the desired range can be more easily analyzed. The exact frequency response of the filter depends on the filter design. In various embodiments, at 408, the controller 22 calculates the moving root mean square (RMS) of the measured SWA signal over a sliding time window. In various embodiments, the controller 22 calculates the frequency response of the measured SWA signals using various fast Fourier Transform techniques such as Goertzel algorithms.

Using one or more of the techniques or algorithms described above, at 408 the controller 22 calculates the measured SWA frequency response. The measured SWA frequency response indicates the magnitude of measured SWA in certain frequencies or frequency bands.

Next, at 410, the controller 22 compares the measured SWA frequency response to the baseline SWA frequency response to determine if the delta between the measured SWA frequency response and the baseline SWA frequency response is equal to or greater than a predefined frequency response delta, or if the delta between the measured SWA frequency response and the baseline SWA frequency response is less than the predefined frequency response delta. The baseline SWA frequency response is a pre-measured or calculated SWA frequency response obtained from the control signal applied to the motor 122 at 404 assuming no pinch conditions have been detected. The baseline SWA frequency response may be saved in the memory of the controller 22. The predefined or maximum frequency response delta is a threshold value indicating an acceptable amount of variation between the measured SWA frequency response and the baseline SWA frequency response. Differences between the measured SWA frequency response and the baseline SWA frequency response greater than a predefined threshold or maximum frequency response delta may indicate a pinch condition.

At 410, the controller 22 also resets a pinch detection timer to a time of zero, and then starts the pinch detection timer to measure an elapsed time period beginning when the difference between the measured SWA frequency response and the baseline SWA frequency response is greater than a predefined threshold or maximum frequency response delta. The pinch detection timer is preferably integrated into the controller 22 of the control system 116 and is operable to measure time. The pinch detection timer may include any device capable of measuring time, such as an electronic clock, and store in the memory of the controller 22 the elapsed period of time since the difference between the measured SWA frequency response and the baseline SWA frequency response was determined to be greater than a predefined threshold or maximum frequency response delta. It should be appreciated that the pinch detection timer measures the period of time continuously until stopped and reset to a value of zero.

If the controller 22 determines that the absolute value of the measured SWA frequency response minus the baseline SWA frequency response is less than the predefined frequency response delta, as indicated at 410, the method 400 proceeds to 412. At 412, the controller 22 resets the pinch detection timer to a time of zero. The sensor data related to the measured SWA frequency response and the baseline SWA frequency response does not indicate that a pinch condition exists.

However, if the controller 22 determines that the absolute value of the measured SWA frequency response minus the baseline SWA frequency response is equal to or greater than the predefined frequency response delta, the method 400 proceeds to 414. At 414, the controller 22 updates the pinch detection timer to indicate an increased period of time that the pinch condition exists and calculates a pinch detection confidence level according to data accessed from one or more predefined lookup tables or from other sources such as mathematical equations. The lookup tables may be stored in the memory of the controller 22. The confidence level can be a value between 0% and 100%, with values close to 0% indicating low confidence that a pinch condition exists and values close to 100% indicating high confidence that a pinch condition exists. A predefined lookup table can be used to calculate the confidence level, for example and without limitation, a two-dimensional lookup table, where the two inputs are the time period measured by the pinch detection timer and the absolute value of the measured SWA frequency response minus the baseline SWA frequency response. Larger values of absolute value of the measured SWA frequency response minus the baseline SWA frequency response, as compared to predefined and calibratable values, indicate a higher confidence level. Similarly, a longer time period measured by the pinch detection timer, and compared to predefined and calibratable values, indicates a higher confidence level.

From 414, the method 400 proceeds to 416. At 416, the controller 22 registers and stores the data indicating that a pinch condition is detected and the associated confidence level. In some embodiments, the data is used to update and refine the predefined lookup tables.

From 416 and 412, the method 400 proceeds to 418. At 418, the controller 22 determines whether one or more conditions to terminate the detection method are satisfied. In some embodiments, the termination conditions include, for example and without limitation, sensor data indicating that the steering column assembly 118 has stopped translating, the steering wheel assembly 120 has stopped rotating, the steering wheel assembly 120 is in the stowed position, the confidence level is high, the pinch detection timer has exceeded a predefined maximum operation time, etc. If one or more of the termination conditions are not satisfied, the method 400 returns to 408 and proceeds as discussed herein. If one or more of the termination conditions are satisfied, the method 400 proceeds to 420 and ends.

In various embodiments, a mathematical model is used to estimate the pinch force or detect an overload or underload condition. The model includes evaluating characteristics and operating parameters of the motor 122 to determine an estimated interference torque. The estimated interference torque is a torque applied to the steering system 112 that affects the stowing process.

For a motor coupled to the steering column, such as the motor 122, a differential equation expressing the stowing or translational movement of the column may be expressed in the motor rotational frame as $$J_m \ddot{\theta}_m = T_m - T_f - b_m \dot{\theta}_m - T_{if}.$$

Where the following variables are defined in the motor rotational frame:
- $j_m$: system inertia including motor inertia, column and steering wheel inertia
- $\theta_m$: motor position
- $T_m$: motor torque
- $T_f$: system friction
- $b_m$: system damping
- $T_{if}$: interference torque The model parameters defined above may be obtained through experimentation and/or analysis. In various embodiments, the values of these parameters depend on variables such as, for example and without limitation, temperature. A state space model can be formed to facilitate the estimate of the interference torque.

$$\underbrace{\begin{bmatrix} \dot{\theta}_m \\ \ddot{\theta}_m \\ \dot{T}_{if} \end{bmatrix}}_{\dot{x}} = \underbrace{\begin{bmatrix} 0 & 1 & 0 \\ 0 & -\frac{b_m}{J_m} & -\frac{1}{J_m} \\ 0 & 0 & 0 \end{bmatrix}}_{A} \underbrace{\begin{bmatrix} \theta_m \\ \dot{\theta}_m \\ T_{if} \end{bmatrix}}_{x} + \underbrace{\begin{bmatrix} 0 & 0 \\ \frac{1}{J_m} & -\frac{1}{J_m} \\ 0 & 0 \end{bmatrix}}_{B} \underbrace{\begin{bmatrix} T_m \\ T_f \end{bmatrix}}_{u}$$

$$\underbrace{\begin{bmatrix} \theta_m \\ \dot{\theta}_m \end{bmatrix}}_{y} = \underbrace{\begin{bmatrix} 1 & 0 & 0 \\ 0 & 1 & 0 \end{bmatrix}}_{C} \underbrace{\begin{bmatrix} \theta_m \\ \dot{\theta}_m \\ T_{if} \end{bmatrix}}_{x} + \underbrace{\begin{bmatrix} 0 & 0 \\ 0 & 0 \end{bmatrix}}_{D} \underbrace{\begin{bmatrix} T_m \\ T_f \end{bmatrix}}_{u}$$

From these expressions, a Kalman filter is designed to convert the estimated interference torque to a pinch force. Using linear or nonlinear techniques, a state observer may be designed. One estimation design is detailed in the following expressions:

$$\dot{x}_e = (A-KC)x_e + Bu + Ker$$

$$Y = x_e,$$

Where: K=[k1 k2]

With an appropriate turning, the output of the observer will asymptotically track the state of the plant (that is, x in the above expressions) and its third component will estimate the interference torque $T_{if}$. The observer gain K is the design parameters. Various control and filtering technologies can be used to design K, for example and without limitation, pole placement, the Kalman filtering, and other optimal and robust filtering methods.

The interference torque expressed in the motor 122 rotational frame can be converted to the interference force of the translational frame of the stowable steering column assembly 118.

In various embodiments, the value of some of the motor parameters used to generate the model are temperature dependent. In various embodiments, the model-based pinch force and interference torque estimation is used in lieu of the sensor-based observations and calculations in the methods 200 and 300 discussed herein.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure. In various embodiments, each of the methods discussed herein can be used independently or combined together, Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context dearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 0.5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one a the listed alternatives at a time, unless the context dearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a vehicle, the method comprising:
    providing a vehicle steering system, the vehicle steering system comprising a moveable steering column assembly and a motor coupled to the steering column assembly;
    providing a sensor connected to the motor and configured to measure a motor velocity;
    providing a controller electronically connected to the sensor and the vehicle steering system;
    monitoring, by the controller, sensor data received from the sensor if a trigger condition is satisfied;
    starting, by the controller, a stowing process timer to measure a time period when the trigger condition is satisfied;
    analyzing, by the controller, the sensor data related to the motor velocity to determine when an overload condition is satisfied, wherein analyzing the sensor data comprises measuring a change in length of the steering column assembly during the measured time period to determine a baseline motor velocity;
    determining, by the controller, a motor velocity delta from a current motor velocity and the baseline motor velocity;
    comparing, by the controller, the motor velocity delta to a maximum motor velocity delta to determine if the motor velocity delta is equal to or greater than the maximum motor velocity delta or if the motor velocity delta is less than the maximum motor velocity delta;
    calculating, by the controller, a detection confidence level from at least one lookup table stored in a memory of the controller; and
    when the overload condition is satisfied, automatically generating, by the controller, a control signal to control the motor, wherein the overload condition is satisfied when the motor velocity delta is equal to or greater than the maximum motor velocity delta.

2. The method of claim 1, wherein the motor is configured to translate the steering column assembly from a first position to a second position.

3. The method of claim 1, wherein the trigger condition includes one or more of an initiation of a stowing operation of the steering column assembly, detection of a hands-off or hands-free steering condition of the vehicle, and receipt of sensor data indicating that the steering column assembly has stopped moving.

4. The method of claim 1, further comprising determining whether a termination condition is satisfied, wherein the termination condition includes one of receipt of sensor data indicating the steering column assembly is in a stowed position, the detection confidence level is high, and the stowing process timer has exceeded a maximum operation time.

5. The method of claim 1, wherein the sensor is configured to measure a motor characteristic and the motor characteristic is a motor deceleration, and the method further comprises comparing a current motor deceleration to a motor deceleration threshold to determine if the current motor deceleration is equal to or greater than the motor deceleration threshold or if the current motor deceleration is less than the motor deceleration threshold, and the overload condition is satisfied if the current motor deceleration is equal to or greater than the motor deceleration threshold.

6. The method of claim 1, wherein the sensor is configured to measure a motor characteristic and the motor characteristic is a motor current, and the method further comprises comparing a motor current to a motor current threshold to determine if the motor current is equal to or greater than the motor current threshold or if the motor current is less than the motor current threshold, and the overload condition is satisfied if the motor current is equal to or greater than the motor current threshold.

7. A method for detecting a pinch condition of a vehicle steering system, the method comprising:
    providing the vehicle steering system, the vehicle steering system comprising a moveable steering column assembly, a steering wheel assembly including a steering wheel, and a motor coupled to the steering wheel assembly;
    providing a sensor connected to the steering wheel assembly and configured to measure a steering wheel angle;
    providing a controller electronically connected to the sensor and the vehicle steering system;
    applying, by the motor, a motor torque signal to the steering wheel assembly;
    monitoring, by the controller, steering wheel angle data received from the sensor if a trigger condition is satisfied;
    analyzing, by the controller, the steering wheel angle data to determine when a pinch condition is satisfied, wherein analyzing the steering wheel angle data further comprises comparing a measured steering wheel angle frequency response to a baseline steering wheel angle frequency response to determine if a steering wheel angle frequency response delta is equal to or greater than a maximum frequency response delta or if the steering wheel angle frequency response delta is less than the maximum frequency response delta; and
    when the pinch condition is satisfied, automatically generating, by the controller, a control signal.

8. The method of claim 7, wherein the pinch condition is satisfied when the steering wheel angle frequency response delta is equal to or greater than the maximum frequency response delta.

9. A system for detecting a steering system condition, the system comprising:
- a vehicle steering system comprising a steering column assembly, a steering wheel assembly, and a motor, wherein the motor is configured to apply a motor torque signal to the steering wheel assembly;
- a first sensor coupled to the motor, the first sensor configured to measure a motor characteristic;
- a second sensor coupled to the steering wheel assembly, the second sensor configured to measure a steering wheel angle;
- a controller electronically connected to the first sensor and the vehicle steering system, the controller configured to determine when a trigger condition is satisfied;
  - monitor first sensor data received from the first sensor when the trigger condition is satisfied;
  - monitor steering wheel angle data received from the second sensor if the trigger condition is satisfied;
  - analyze the steering wheel angle data and compare a measured steering wheel angle frequency response to a baseline steering wheel angle frequency response to determine if an absolute value of the measured steering wheel angle frequency response minus the baseline steering wheel angle frequency response is equal to or greater than a maximum frequency response delta or if the absolute value of the measured steering wheel angle frequency response minus the baseline steering wheel angle frequency response is less than the maximum frequency response delta and determine if a pinch condition is satisfied;
  - analyze the first sensor data related to the motor characteristic to determine when an interference condition is satisfied; and
  - when the interference condition is satisfied, automatically generate a control signal to control the motor.

10. The system of claim 9, wherein the motor characteristic is a motor velocity, the controller is further configured to determine a motor velocity delta from a current motor velocity and a baseline motor velocity and compare the motor velocity delta to a maximum motor velocity delta to determine if the motor velocity delta is equal to or greater than the maximum motor velocity delta or if the motor velocity delta is less than the maximum motor velocity delta and the interference condition is satisfied if the motor velocity delta is equal to or greater than the maximum motor velocity delta.

11. The system of claim 9, wherein the pinch condition is satisfied if the absolute value of the measured steering wheel angle frequency response minus the baseline steering wheel angle frequency response is equal to or greater than the maximum frequency response delta.

12. The system of claim 9, wherein the controller is further configured to mathematically estimate an interference torque from data obtained from the first sensor to determine if the interference condition is satisfied.

* * * * *